Patented June 3, 1952

2,599,016

UNITED STATES PATENT OFFICE 2,599,016

REFINING SOYBEAN LECITHIN

Herbert Otto Renner, Des Plaines, Ill., assignor, by mesne assignments, to J. R. Short Milling Company, Chicago, Ill., a corporation of Illinois No Drawing. Application June 16, 1947,
Serial No. 755,022

4 Claims. (Cl. 260—403)

This invention pertains to new methods of preparing lecithins, and more particularly has reference to the preparation of soybean lecithin by treatment with organic solvents which remove undesirable organoleptic constituents and those impurities which adversely affect its viscosity and coloring power, all of which markedly improve its edible and physiological properties. The process constituting this invention applies to commercial soybean lecithin the same principles of extraction with cellosolves which were used to refine particulate soybean materials, as disclosed in my copending application Serial No. 730,539, filed February 24, 1947, now Patent No. 2,524,991; hence this application is a continuation in part of that application.

Commercial lecithins, as prepared by prior art processes, have been employed for many useful purposes in industry, such as paint formulation and the preparation of cosmetics, and to a limited extent in the preparation of certain food products, such as chocolate coatings for confectionery and bakery products. The high nutritive value and food improving qualities of lecithins have been long recognized, particularly in the field of baking, but the undesirable oily flavors and odors of prior art commercial lecithins, and their high viscosity and coloring power, have heretofore permitted the use of only more or less negligible amounts (e. g. about 0.2% by weight of flour) in the preparation of bakery products. These adverse properties of prior art lecithins have prevented the full exploitation of the several benefits which would be derived from the use of higher amounts of lecithins in the baking art. Thus, experiments showed that marked improvements in loaf volume, texture, grain and keeping quality of bread would result from using more than 1% of lecithin, but the undesirable flavor, odor and color of such bread barred the use of such beneficial quantities of commercial lecithin, as heretofore produced.

The present invention teaches how it is possible to produce an improved lecithin substantially free of undesirable organoleptic properties when used in the preparation of food products; also how to produce an improved lecithin of substantially lower viscosity than has heretofore been produced.

Another feature of this invention is the production of an improved lecithin of materially less food coloring power than prior art lecithins.

Still another feature of this invention is the production of a refined lecithin of substantially purer and higher nutritive quality by treating commercial lecithin with solvents which remove adverse organoleptic and food coloring constituents therefrom.

Still another feature of this invention is the production of an improved lecithin of substantially higher nutritive value by treatment which increases the ratio of phosphorus to nitrogen in said lecithin over the ratios of said elements in commercial lecithins heretofore produced.

With these and other features and objects in view which may be incident to my improvements, my invention consists in the combination and arrangement of elements and steps hereinafter described and illustrated by typical examples.

The principle of my invention is illustrated in a general way in Table I.

TABLE I

| Raw Materials Used and originating in soybeans | Method of Treatment | Refined Products Produced | By-Products of unknown or potential value |
|---|---|---|---|
| Soybean Lecithins (Commercial or Crude). | Fixed Ratio Batch-extraction with "Cellosolves." | Cellosolve insoluble Lecithin fractions. | Cellosolve Soluble Lecithin fractions. |

Column 1 of Table I shows the raw materials used in my process, column 2 indicates the method of treatment employed, while columns 3 and 4 represent respectively the desired refined products and the by-products produced by my process.

The general term "Cellosolves," appearing in column 2 of Table I and elsewhere in this application, includes both "methyl Cellosolve," (2-methoxy ethanol or glycol monomethyl ether), and "ethyl Cellosolve" (2-ethoxy ethanol or glycol monoethyl ether). For brevity in the following, the general term "Cellosolve" is used in lieu of the longer and more explicit chemical identification. While most of the results disclosed in this application were obtained by employing methyl Cellosolve, it was found that substantially the same results were obtained by the use of "ethyl Cellosolve," but the former is preferred on account of its lower boiling point, particularly where low temperature vacuum distillation or evaporation were the only means permissible for the removal of all traces of solvent from the product. For the same reasons (high boiling points) butyl and benzyl Cellosolve, while ordinarily included in the general term "Cellosolve," were not used as solvents in the processes herein disclosed and although they might theoretically be so employed, their commercial usefulness for this purpose appears negligible.

Methyl Cellosolve is abbreviated "m-Cel."

In developing the improved processes of refining soybean meal disclosed in my copending application Serial No. 730,539, filed February 24, 1947, now Patent Number 2,524,991 I discovered that soybean lecithin contains the same undesirable organoleptic constituents as soybean meal and can also be flavor-and-odor refined by extraction with m-Cel according to the principles described in that application. By applying these principles of m-Cel extraction to commercial soybean lecithins which are characterized by more or less unpleasant soybean oily flavors and odors, I have succeeded not only in removing such flavors and odors, but also in markedly reducing the viscosity and coloring power of said lecithins. The resulting refined lecithins, owing to their improved characteristics, may be used in far greater amounts than prior art commercial lecithins in preparing food products without deleterious effects. This greatly extends the usefulness and physiological value of lecithins in the prepared food industry and makes possible beneficial results not heretofore attainable in this field and particularly in bakery products.

In refining commercial lecithins with m-Cel, it should be pointed out that the process deals with systems comprising two liquid phases of differing specific gravities; that said lecithins, particularly at increased temperatures, become more soluble in the solvent with increasing ratios of the latter; and correspondingly, the effectiveness of the refining operation is optimal at a lecithin/solvent ratio (abbr. L/S) at which, at a given low temperature, the solubility of the substances to be removed by selective solubility from the lecithins in the solvent-phase has reached a maximum.

The following Example I (using an extraction ratio of $L/S = 1$ g./3-4 cc. at ordinary temperature) and Example II (using the ratio of $L/S = 0.96$ g./1 cc. at 4.4° C. (40° F.) serve to illustrate the processes of this invention.

*Example I*

100 parts by weight of a commercial soybean lecithin (e. g. "Yelkin BSS" of American Lecithin Company) were warmed with 300–400 parts by volume of m-Cel during gentle agitation. After allowing the mixture to cool to ordinary temperature (21.1° C. = 70° F.) a soft, smeary, m-Cel-insoluble bottom residue (R) and a supernatant, clear, brownish solvent phase (S) had formed. By centrifuging of the mix, at ordinary temperature the two phases were separated, and the golden-yellow, clear solvent-phase (S) was freed of the solvent by vacuum-distillation at maximal 50–55° C. The remainder of the solvent phase (S), representing the m-Cel-soluble fraction of the lecithin, amounting to approx. 62% by weight of the original lecithin, had the consistency of a stiff-sticky grease, pure but intense brownish-yellow color, and a rather bland flavor which after eight months' storage in a cold, closed container reverted to a very pronounced, adhering and unpleasant soybean flavor.

In contrast thereto, the refined m-Cel-insoluble fraction, obtained by freeing the smeary bottom residue (R) from solvent by vacuum-distillation at max. 50° C., in an amount equivalent to approx. 38% by weight of the original lecithin, had an entirely bland flavor which did not deteriorate during 8 months' storage; and at the same time had much less intense color than the remainder of the solvent phase.

The above refining ratio of 38% : 62% was far from optimal both, with regard to yield of the refined m-Cel-insoluble fraction and as to degree of refining accomplished, as shown by Example II, which represents a preferred embodiment of this invention.

*Example II*

Using a weight-ratio of $L/S = 1/1$, a mix of 960 grams of a commercial lecithin (e. g., "Centrol No. 1") and 960 grams = 1000 cc. of m-Cel was uniformly liquified by warming in a water bath to 43.3° C. (112° F.) and, after agitating thoroughly for 25 minutes during cooling to 10° C. (50° F.), was allowed to rest. After standing 40 minutes the mix separated into a bottom phase, of considerably lighter, and more brownish color, than the very deep, reddish-colored, top phase. The fact that extended standing of the mix for about two days did not change the phase volume ratio of bottom and top phases = 31/19, obtained after 40 minutes, made prolonged rest periods superfluous and uneconomical. The solvent top phase was then drawn off from the bottom phase in separatory funnel in 190° F.-waterbath and freed in vacuo of all solvent. The remaining m-Cel-soluble fraction (S) thus obtained amounted to 12.1% by weight of original lecithin and consisted of a stiff gummy, rather dry mass, easily chewable, of very intensive dark reddish-brown color and adhering, rather unpleasant, soy-bean flavor.

On the other hand, removal of solvent from the bottom phase by heating in vacuo, with complete absence of air (blowing with an inert gas has been found particularly effective in speeding up the removal of solvent) in boiling water bath, produced an m-Cel-insoluble fraction (R), amounting to 87.9% by weight of original lecithin. This consisted of a syrupy liquid, freely flowing even at refrigerator temperatures, with the outstanding advantages over commercial lecithin, of rather non-suggestive odor and flavor, golden-yellow color (in thin layers), and a decidedly lower coloring power than the m-Cel soluble fraction (S).

Table II shows the comparative color-ratings (in Wesson-tintometer, at 80° F.), and colorimetric equivalents of 1% solutions of the original commercial lecithin, the m-Cel soluble fraction (S) and the m-Cel insoluble fraction (R) with standard 0.04% potassium bichromate solutions in water:

TABLE II

|  | Commercial Lecithin | m-Cel-insoluble Refined Fraction (R) | m-Cel-soluble Fraction (S) |
|---|---|---|---|
| Color Readings (Lovibond Standards) of 1% Solution in paraffin oil, standard height, at 80° F., Wesson-tintometer. | 70 Y 1.4R | 35 Y 1.4 R easiest to dissolve in paraffin oil due to fluidity. | 70 Y 4.0R slowest to dissolve in warm paraffin oil. |
| Colorimetric Equivalents of above 1% Solutions vs. 10 mm. 0.04% $K_2Cr_2O_7$-Solution. | 15.7 mm | 32.0 mm | 3.7 mm. |

The data of Table II reveal a very apparent 50% color reduction of yellow in (R) in comparison with the original lecithin, while the figures under (S) show a very pronounced accumulation of red in (S) resulting in a similar increase in coloring power of (S) in comparison with that of R which latter amounts to only 11.5% of the coloring power of (S) and to only 49.0% of that of the original lecithin.

The high fluidity and decreased coloring power of m-Cel-refined lecithin, such as (R) of Example II and Table II, permit its use in cases where high viscosity and coloring power formerly barred its use, or allowed the use of only small amounts which prevented the full exploitation of the benefits derived from the use of higher amounts. This is particularly true for the field of baking where, as has been found, the use of more than negligible amounts (about 0.2% by weight of flour) has never been considered although the above results reveal that unexpected new benefits (improvements of load volume, texture, grain, keeping quality), are derived from using more than 1% of lecithin, provided the coloring power of the latter is reduced to such an extent so as not to adversely affect the crumb color of the finished products, which is only true when using m-Cel-refined lecithins of the type (R), in Table II and Example II.

Although relatively little is known about the exact chemical nature of the m-Cel-soluble fractions such as (S), Table II, the removal of which brings about the above outlined benefits to the m-Cel-insoluble fractions such as (R), Table II, the following facts show that the Cellosolve-treatment brings about a certain fractionation of phosphatides, as well as colored matters or pigments, while the soy oil usually present in commercial lecithins in rather high percentages remains essentially unmodified—at least under optimal refining conditions adopted for lecithins:

(a) A sample of "purified soybean phosphatides," represented by lecithin freed of soy oil by exhaustive washing with acetone, was submitted to m-Cel-refining, using a ratio of 1 g. phosphatides : 4.5 g. solvent, at ordinary temperature. The material was then fractionated into 44% of m-Cel-soluble and 56% of m-Cel-insoluble fractions, the latter of which has little, non-soybean flavor in contrast to the strong soybean flavor of the m-Cel-soluble fraction. Both fractions displayed equal (although negligible) antioxygenic activity in lard.

(b) Determinations of nitrogen ($N_2$) and phosphorus (P) contents and the factor P/N, used somewhat empirically to depict lecithin quality, for a series of m-Cel-soluble (S), m-Cel-insoluble (R) fractions and the corresponding original lecithins from which these two fractions were prepared, disclosed that, as a general rule, the removal of the fractions (S) from the original lecithins in all cases increased the value of P/N for fraction (R); correspondingly the $N_2$-content of (R) dropped to the lowest values in comparison with the original lecithin and the fraction (S).

Table III shows these highly interesting results, #4 as compared to #3 showing the surprising ununiformity of commercial lecithins of the same brands.

TABLE III

| Table No. | Material Tested | Moisture Content, Percent | On Dry Basis | | Factor P/N |
|---|---|---|---|---|---|
| | | | $N_2$-Content | P Content | |
| 1 | Crude commercial lecithin (Yelkin BTS) | 0.02 | 0.73 | 1.67 | 2.28 |
| 1a | R from #1 (81% yield) (ratio: 1:1) | 0.60 | 0.66 | 1.73 | 2.61 |
| 1b | S from #1 (19% yield) | 0.39 | 0.97 | 1.63 | 1.68 |
| 2 | Commercial lecithin (Yelkin BSS) | 0.40 | 0.78 | 1.69 | 2.14 |
| 2a | R from #2 (67.4% yield ratio: 1:1) | 5.4 | 0.73 | 1.73 | 2.36 |
| 2b | S from #2 (32.6% yield) | 4.4 | 0.85 | 1.72 | 2.02 |
| 3 | Commercial lecithin (Centrol No. I) 1st Sample | 0.84 | 0.81 | 1.78 | 2.20 |
| 3a | R from #3 (80% yield; ratio 1:1) | 2.75 | 0.76 | 1.70 | 2.24 |
| 3b | S from #3 (20% yield) | 0.25 | 1.03 | 1.67 | 1.62 |
| 4 | Commercial lecithin (Centrol No. I) 2nd Sample | 1.35 | 0.77 | 1.42 | 1.85 |

My invention has been disclosed herein for illustrative purposes in its preferred embodiment, but it is to be understood that the scope of the invention is defined by the appended claims rather than by the foregoing description.

What I claim is:

1. A process of refining commercial soybean lecithin, which process consists essentially of extraction of said lecithin with a material selected from the group consisting of 2-methoxy ethanol and 2-ethoxy ethanol, and the removal of the extract from the residue.

2. A process of refining commercial soybean lecithin, which process consists essentially of dissolving with a material selected from the group consisting of 2-methoxy ethanol and 2-ethoxy ethanol those fractions of said lecithin which are soluble in said solvent, and removing said fractions from the residue containing the refined lecithin.

3. A process of refining commercial soybean lecithin, which process consists essentially of the extraction of said lecithin with 2-methoxy ethanol, and the removal of the extract from the residue.

4. A process of refining commercial soybean lecithin, which process consists essentially of dissolving with 2-methoxy ethanol those fractions of said lecithin which are soluble in said solvent and removing said fractions from the residue containing the refined lecithin.

HERBERT OTTO RENNER.

REFERENCES CITED

The following references are of record in the file of this patent:

UNITED STATES PATENTS

| Number | Name | Date |
|---|---|---|
| 2,200,391 | Freeman | May 14, 1940 |
| 2,320,738 | Jenkins | June 1, 1943 |
| 2,327,766 | Cawley | Aug. 24, 1943 |
| 2,356,382 | Christiansen | Aug. 22, 1944 |
| 2,390,528 | Freeman | Dec. 11, 1945 |